United States Patent
Beygelzimer et al.

(10) Patent No.: US 8,341,610 B2
(45) Date of Patent: Dec. 25, 2012

(54) METHOD AND APPARATUS FOR AUTHORING AND OPTIMIZING FLOWCHARTS

(75) Inventors: Alina Beygelzimer, White Plains, NY (US); Mark Brodie, Briarcliff Manor, NY (US); Sheng Ma, Briarcliff Manor, NY (US); Jonathan Lenchner, North Salem, NY (US); Irina Rish, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 1221 days.

(21) Appl. No.: 11/686,959

(22) Filed: Mar. 15, 2007

(65) Prior Publication Data

US 2008/0227066 A1    Sep. 18, 2008

(51) Int. Cl.
*G06F 9/45* (2006.01)
*G06F 9/44* (2006.01)

(52) U.S. Cl. ......................... 717/148; 717/124
(58) Field of Classification Search .......... None
See application file for complete search history.

(56) References Cited

U.S. PATENT DOCUMENTS

| | | | |
|---|---|---|---|
| 6,361,169 B1 * | 3/2002 | Tung | 351/219 |
| 6,868,409 B2 * | 3/2005 | Matsui et al. | 706/11 |
| 7,536,595 B1 * | 5/2009 | Hiltunen et al. | 714/26 |
| 2002/0044296 A1 * | 4/2002 | Skaanning | 358/1.14 |
| 2003/0046305 A1 * | 3/2003 | Clarkson | 707/104.1 |
| 2005/0114743 A1 * | 5/2005 | Moorhouse | 714/100 |
| 2006/0178791 A1 * | 8/2006 | Fountain et al. | 701/31 |
| 2007/0192179 A1 * | 8/2007 | Van Luchene | 705/14 |

\* cited by examiner

*Primary Examiner* — Wei Zhen
*Assistant Examiner* — Adam R Banes
(74) *Attorney, Agent, or Firm* — Whitham, Curtis, Christofferson & Cook, P.C.; Daniel P. Morris

(57) ABSTRACT

A method and system for generating problem resolution flowcharts, whereby users do not author flowcharts directly but instead author a dependency matrix of questions and answers related by state or underlying problem cause. After creation of a matrix of questions and answers, a corresponding flowchart is then calculated based on the information in the dependency matrix, and also based on the likelihood of the various problems and their causes. The probabilities of problems and their causes may be estimated or may be calculated from historical data accumulated by use of the flow chart, or some combination of the two. These probabilities are incorporated into the answer cells of the dependency matrix. The resulting flowchart is tested and evaluated, and the results of testing and evaluation are used to make modifications in the matrix of questions and answers. The flowchart is then made available for execution by a problem determination engine, usable by staff at a help center or directly as self-help to a customer over a network. Experience from use of the problem determination engine is accumulated for use in further refinements of the dependency matrix and its probabilities.

20 Claims, 6 Drawing Sheets

METHOD AND APPARATUS FOR AUTHORING AND OPTIMIZING FLOWCHARTS

BACKGROUND OF THE INVENTION

1. Field of the Invention

The present invention generally relates to flow charts for problem resolution, and in particular to techniques for the development of such flow charts.

2. Background Description

The established procedure for diagnosing a problem in a faulty system is often embodied in a flowchart or decision tree. The system can be a piece of hardware, a piece of software, or a combination of hardware and software components. The diagnostic procedure may be executed by support personnel at a call center, by a voice response unit, by a web application when the system user seeks self-help, or it may even be executed automatically by the system itself in self-healing environments.

A flowchart is a very natural way of representing the knowledge needed to diagnose problems. If the flowchart is comprehensive, it is usually easy for a human, even a non-expert, to follow the flowchart and diagnose the problem. At each node the human (or machine) can elicit the necessary information and decide which branch to follow, until a leaf is reached at which no more information is needed and the diagnosis is obtained. Flowcharts are a very good way of documenting the knowledge developed over time by people in resolving complex problems using their experience and expertise.

However, flowcharts suffer from a number of difficulties that restrict their utility for many applications. Firstly, they are quite difficult to author manually. It is quite expensive to obtain the necessary knowledge from human authors, because a large number of possible branches need to be considered to create a comprehensive flowchart. Even if a good initial flowchart can be manually built, maintaining the flowchart is an endless source of further difficulty. For example, every time a new type of fault is discovered, it needs to be added to the flowchart. A human being will at best typically add a new fault so that it does not take too long to diagnose and does not cause too much modification of the underlying flowchart structure. This can quickly result in the flowchart becoming unmanageably complex and incomprehensible.

A second major problem with manually authored flowcharts is that they are almost always sub-optimal. An optimal flowchart is one that minimizes the average cost of diagnosis, e.g., the average number of questions: common problems should be diagnosed more quickly by asking about them first, before asking about less common problems. To maintain optimality, a diagnostic flowchart must necessarily modify itself in response to changes in the frequency with which symptoms and problems occur. Manually authored flowcharts tend to become increasingly sub-optimal over time because of the difficulty of maintaining them. This can result in unnecessarily expensive diagnostic procedures—a particularly annoying example of this is the asking of unnecessary questions when consulting customer help.

It is of course possible to construct a flowchart using traditional decision-tree learning from training data. However, training data can be difficult to obtain (a working diagnostic system must already be in place before any training data can be collected). Furthermore, this approach fails to take advantage of the knowledge of human experts. People often have a very good understanding of what information should be elicited to perform the diagnosis, but they are usually unable to arrange the questions in the optimal order, given the frequency of the problems and symptoms and the complexity of considering all possible diagnostic paths.

For example, in recent times telephone help centers have become a widely used means for resolving customer problems. In a typical help center, a customer will be referred to someone trained to listen to the customer's problem and ask questions in a dialogue that leads to a solution for the customer. If the initial trained person is not able to resolve the problem, the customer may be referred to a second tier of experts with greater training and experience.

In order to improve their performance, help centers have developed flow charts showing questions that should be asked, with branching points to further questions based on the answers received, eventually leading to resolution of the customer's problem. These flowcharts are developed and modified based on experience accumulated over time by operation of the help center.

However, as more experience is accumulated and small changes are made in increments to adapt to the new experience, the flow charts tend to grow and develop without the benefit of a fresh assessment of the most efficient sequence for asking the questions. The flow charts become increasingly difficult to maintain.

The classical resolution of this problem was the evolution of Case Based Reasoning, which was explored heavily in the 1990s. Case Based Reasoning systems collected expertise in a library of past cases, where each case contained a description of the problem and the solution. To solve a current problem, the system retrieves past cases having similar problems and these past cases are used to suggest a solution, which is then tested and revised, as necessary, and added to the library.

Case Based Reasoning systems tended to succeed in fields which lacked a strong "domain theory" i.e. in fields where the connection between symptoms and causes was weakly understood. However, this is not typically the case in many help-desk scenarios.

SUMMARY OF THE INVENTION

It is therefore an object of the present invention to provide a system for efficient development and maintenance of flow charts.

It is also an object of the invention to build upon an understanding of the connection between symptoms and causes in order to develop and maintain flow charts.

A further object of the invention is to develop flow charts from a representational system whose logic is easy to maintain in response to new information learned by the help center.

In the present invention we disclose a method for automatically building an alternative representation of the knowledge underlying diagnostic flowcharts. The method creates a simple Bayesian network that is consistent with the available "legacy" flowchart without asking an expert to go through the Bayesian network creation process. The new representation has a number of advantages:

(1) Knowledge is easier to maintain and update—authors simply need to specify the new questions or tests they might want to ask and, if available, what answers each test might yield, depending on the state of the system. No ordering information on the tests is needed, although ordering constraints can be provided if desired. Faults, tests and symptoms can be easily added, deleted and modified.

(2) An efficient flowchart can be generated using a simple greedy algorithm that selects the order of tests along all possible paths, taking into account the frequency with which symptoms and problems occur. This flowchart can be shown to be close to the optimal flowchart obtained by exhaustive search. Given enough computing resources, or a sufficiently small number of tests and states, an exhaustive search may of course be used to generate the optimal flowchart.

(3) The generated flowchart changes automatically as data about the frequency of faults and symptoms is obtained from use of the diagnostic system. Thus both prior human knowledge and training data are leveraged to allow for continuous learning of efficient diagnostic procedures.

(4) Any pre-existing ("legacy") flowchart can be easily converted into the new representation. This allows us to take advantage of human expertise by creating an optimized version of any existing flowchart. Two types of optimization are particularly common: unnecessary tests are removed, and the order of questions may change as the problem frequency changes.

In the present invention users do not author flowcharts directly but instead author spreadsheets or matrices of questions and answers related by state or underlying problem cause. After creation of a matrix of questions and answers, a corresponding flowchart is then calculated based on the information in the spreadsheet, and also based on the likelihood of the various problems and their causes. The probabilities of problems and their causes is calculated from historical data accumulated by the help center, or may be obtained from other sources. The resulting flowchart is tested and evaluated, and the results of testing and evaluation are used to make modifications in the matrix of questions and answers. The flowchart is then made available for execution by a problem determination engine, usable by staff at a help center or directly as self-help to a customer over a network.

The invention provides a method for developing and maintaining problem resolution flow charts using a dependency matrix as the primary repository of information for responding to a particular problem space, such as operation of a particular brand or class of computer equipment or peripheral. The dependency matrix is authored by defining questions to be asked of a user experiencing problems with the equipment, and providing answers to those questions for the various states of the equipment. The invention provides tools to facilitate construction of the dependency matrix, and then automatically generates a flowchart from the dependency matrix. The flowchart is then tested, and test results are used to edit the questions and states which define the dependency matrix, and also to modify the matrix cell values showing answers that relate each of the questions with each of the states. A cell value may have multiple answers, with a probability of each answer. Ideally, the flowchart presents the questions in an optimally informative order, a result which is approached through interactive repetition of the matrix authoring steps and flowchart generating and testing steps. The order of questions is determined automatically from probabilities contained in cell values in the dependency matrix.

When the flowchart is reasonably complete it is published for use in a problem determination engine, which executes the flowchart by asking questions and branching to further questions based on the answers provided by a user experiencing problems, either directly or via help desk personnel operating the problem determination engine. The information gathered from operation of the problem determination engine may be used in further refinement of the dependency matrix by repeating the authoring, generating and testing steps.

An aspect of the invention is a method for developing and maintaining problem resolution flow charts by authoring a dependency matrix of questions and states, thereby describing a problem to be resolved, generating a flowchart from the dependency matrix, and testing the flowchart. The flowchart is authored by editing the questions and states and modifying cell values relating each of the questions with each of states, where values in each cell comprise one or more answers to the related question in the related state and a probability for each indicated answer, there being a probability of occurrence for each state.

In a further aspect of the invention the questions have associated costs expressed in some unit of measure, and the flowchart presents the questions in an optimally informative order. The associated costs for questions may be learned by experience. The optimally informative order of questions may be determined automatically from probabilities contained in cell values in the dependency matrix. The authoring, generating and testing steps may be interactively repeated, at each iteration the initial probability estimates are supplemented by asking the questions and determining the state of the problem, so that data from test experience gradually replaces the initial user estimates.

In another aspect of the invention, the flowchart is used in a problem determination engine. The method can be further extended by gathering information from operation of the problem determination engine, and providing the gathered information for use in interactively repeating the authoring, generating and testing steps. The flowchart generated from the dependency matrix can be comprised of branching question and answer sequences, where an answer to one question leads to a further question until a problem diagnosis is reached or a terminal node is encountered. The flowchart may be generated so as to minimize the expected total cost of the questions required to reach a diagnosis.

BRIEF DESCRIPTION OF THE DRAWINGS

The foregoing and other objects, aspects and advantages will be better understood from the following detailed description of a preferred embodiment of the invention with reference to the drawings, in which:

FIG. 3A is an example of a dependency matrix depicting the possible states or underlying problems in columns and problem resolution questions in rows.

DETAILED DESCRIPTION OF A PREFERRED EMBODIMENT OF THE INVENTION

Figure 1:
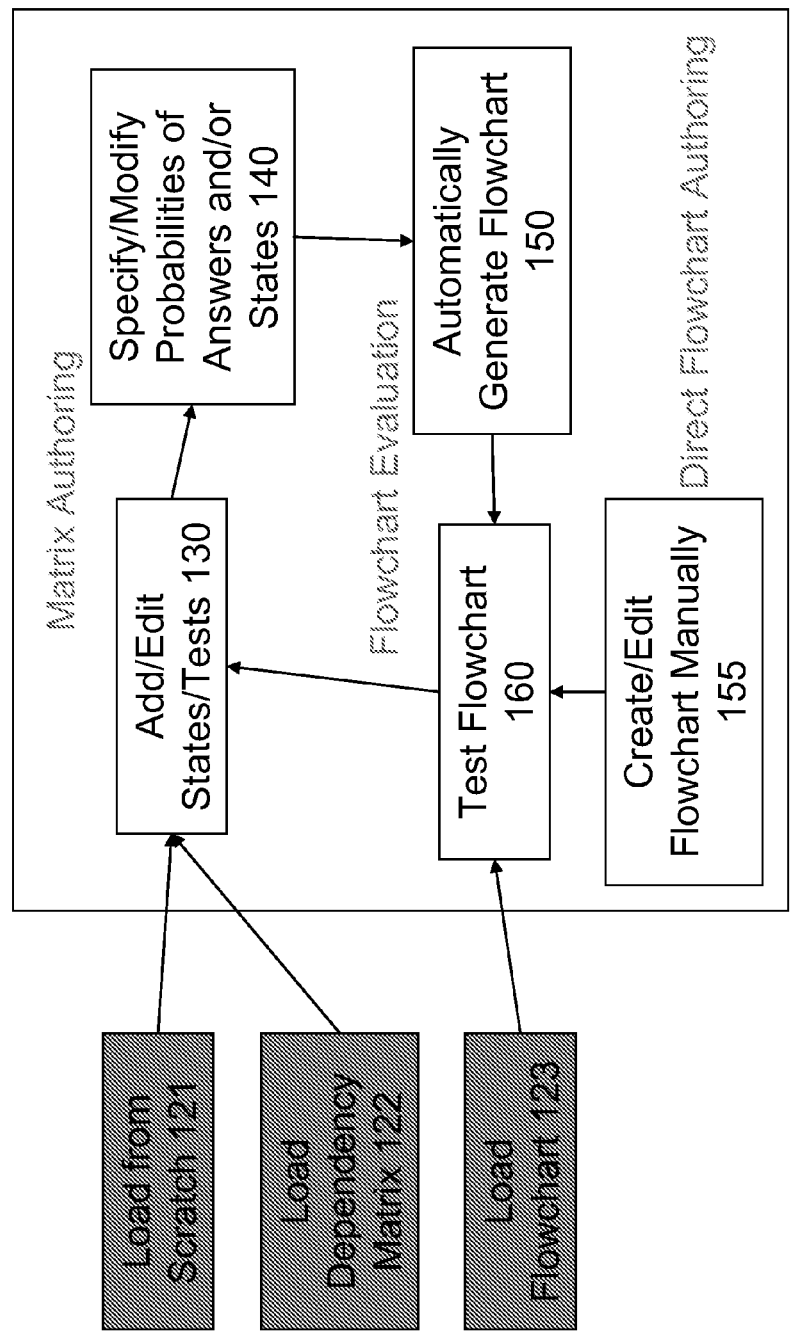
FIG. 1 is a schematic diagram showing operation of the invention.

Referring now to the drawings, and more particularly to FIG. 1, there is shown a schematic depicting operation of the invention. The kernel of the invention 110 is a methodology that cycles between authoring and evaluation phases to create and refine a spreadsheet/matrix that in turn generates a flowchart used to walk a customer through a problem space. For the purposes of illustration, the problem space is the operation of a product as experienced by a customer using the product, but those skilled in the art will understand that the invention may be implemented in any problem space where the connection between symptoms and causes is reasonably well understood.

In the authoring phase, the invention provides two functions. A first function 130 is used to add or edit states and/or questions to a dependency matrix of answers to questions. The dependency matrix may be arranged in rows and columns, where each row represents a question and each column represents a state, as will be further described below in reference to FIG. 3. Possible states include a) the condition of a particular state of the product, b) the existence of a particular problem or product condition identifiable by the customer, or c) the applicability of a solution/response that could be presented to the customer.

In a second function 140 the user of the invention specifies the probabilities of the various answers to each question. The value in the answer cell at a particular row and column encodes the answer when the question is asked in that state. More generally, the cell value encodes the likelihood of different answers when the question is asked in that state. Based on the questions and states of the dependency matrix as revised in block 130, and the cell answers specified or modified in block 140, a flowchart is automatically generated at block 150 or manually created or edited by directed flowchart authoring at block 155. The flowchart is then tested at block 160, providing information used to return to block 130 for further edits to the dependency matrix.

Entry into the invention may begin from any of several conditions of flowchart preparation. If no work has yet been done on the flowchart, as represented in item 121, the entry point is block 130, where a dependency matrix may be created by adding rows and columns of questions and answers. If a dependency matrix has already been created, as represented in item 122, the matrix can be loaded at block 130. If a flowchart has been prepared, as represented by item 123, the flowchart may be tested at block 160. Based on the results of those tests, a dependency matrix is then created or revised from the flowchart at block 130.

Figure 2:
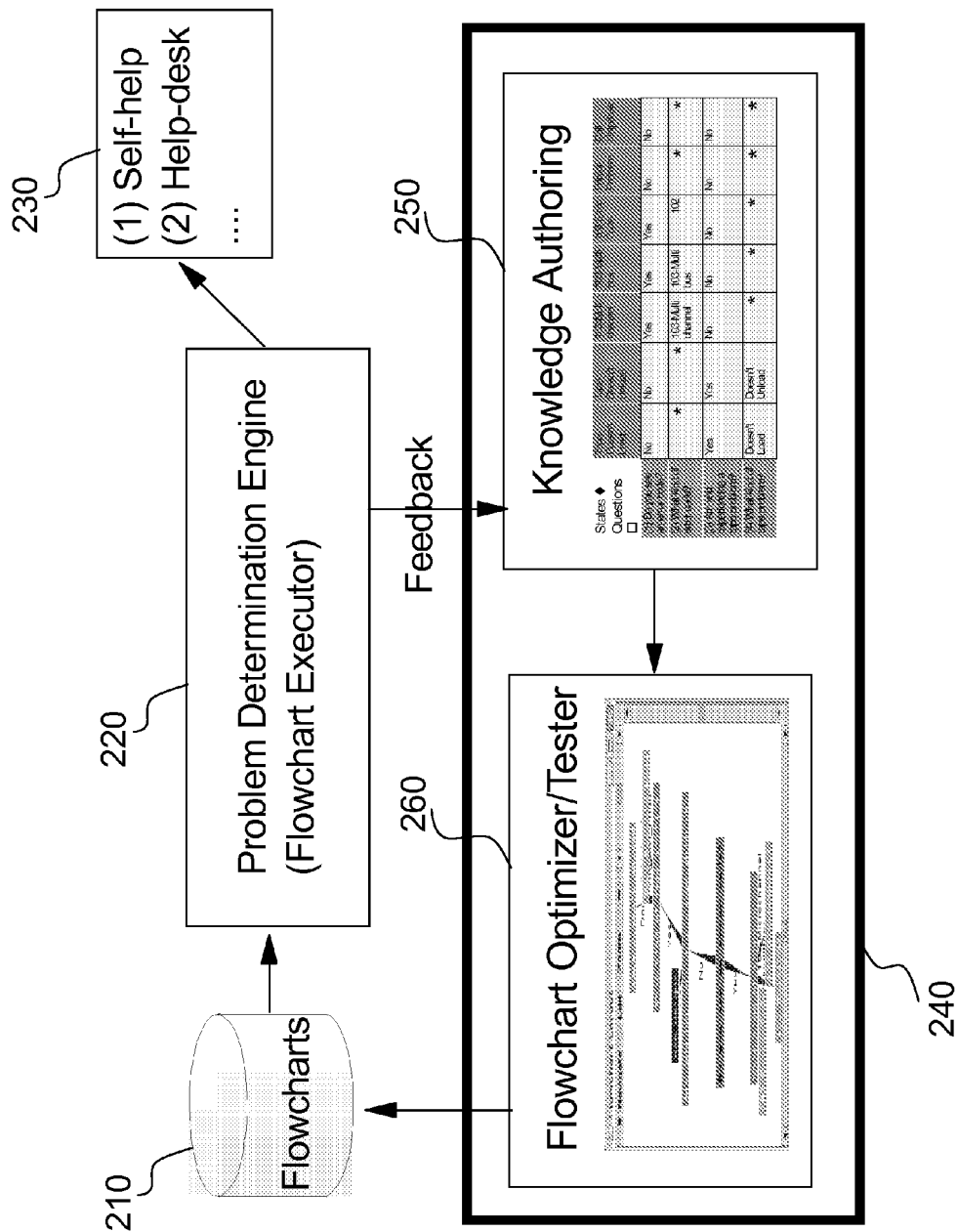
FIG. 2 is a schematic diagram showing an exemplar implementation of the invention.

The context within which the flowchart authoring and testing cycle 240 operates is shown in FIG. 2. Knowledge is applied to the dependency matrix in the authoring portion of the cycle 250, and then the flowchart generated from the information in the matrix is put through an evaluation 260 in order to test and optimize the flowchart. Flowcharts 210 produced by the cycle 240 are fed to problem determination engine 220 for execution. This engine 220 may be used by users in a self-help mode or by help-desk personnel to resolve problems presented by users, as indicated in block 230. Problem determination engine 220 monitors the responses of users and help-desk personnel to operation of the engine and provides feedback to the FLOAT cycle, which is then repeated.

Figure 3:
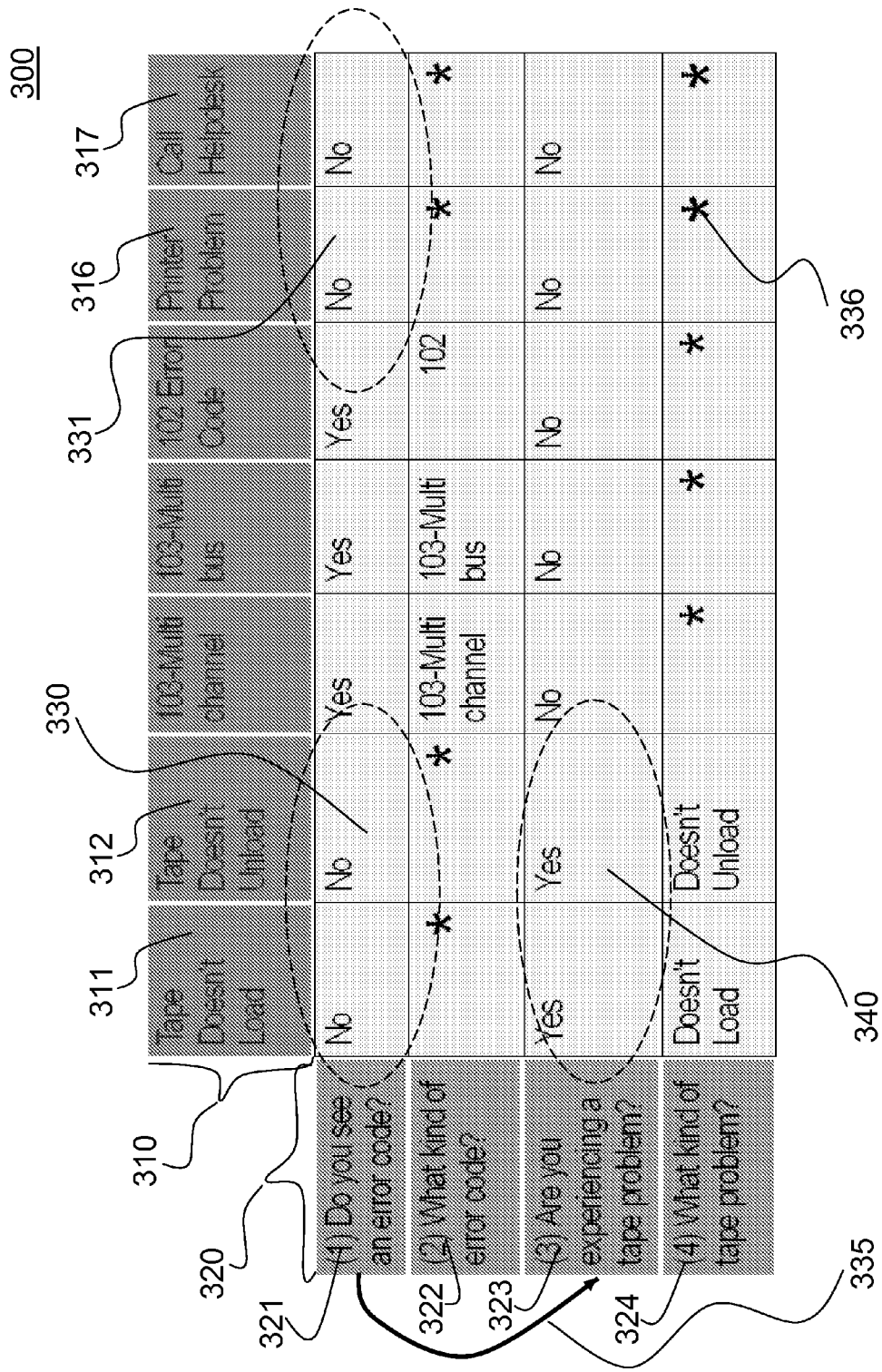
FIGS. 3 and 3A are exemplar representations of a portion of a dependency matrix constructed in accordance with the invention.

An exemplar dependency matrix 300 is shown in FIG. 3. This matrix is designed to provide answers to question concerning use of a tape machine, and will be used to explain how a dependency matrix is constructed and maintained. Rows of questions 320 and columns of states 310 define an array of cell answers. The series of questions 320 and relevant states 330 represent only a portion of what may eventually become a comprehensive matrix covering possible questions that may arise in resolving user problems regarding a particular model of tape machine or a broader array of tape machines.

Each question 320 may not be relevant to all of the states 310, as indicated by an asterisk ("*", e.g. 336) in an answer cell. Consider, for example, the problem states "Tape Doesn't Load" 311 and "Tape Doesn't Unload" 312. In response to the question, "Do you see an error code?" 321 the answer to the question for both states is "No" 330. But if the user does not see an error code, then it makes no sense to ask the next question, "What kind of error code?" 322. Therefore there is an asterisk in the answer cells for this question corresponding to the states "Tape Doesn't Load" 311 and "Tape Doesn't Unload" 312.

For this simple example, it is easy to anticipate how a flowchart would be structured. If the answer to the question, "Do you see an error code?" 321 is "No" 330, then the flow chart would skip the question "What kind of error code?" 322 as shown by the arrow 335. However, a dependency matrix according to the invention handles more complex situations than shown here. To provide a simple example, consider the next question, "Are you experiencing a tape problem?" 323. If the user is in fact experiencing a tape problem, then the answer for each of the states "Tape Doesn't Load" 311 and "Tape Doesn't Unload" 312 is "Yes" 340. On the other hand, it will be observed that two other states, "Printer Problem" 316 and "Call Helpdesk" 317 are also consistent with the answer "No" 331 to the question "Do you see an error code?" 321.

The problem for automatic generation of the flowchart is how to determine what is the best question to ask next. This problem is resolved by the probability data provided in block 140 and shown expressly in the dependency matrix exemplar given in FIG. 3A. In FIG. 3, if the user does not see an error code, the probability that the user is "experiencing a tape problem" may be higher than the probability of having a printer problem 316 or needing to call the helpdesk 317. The function of block 140 in FIG. 1 is to include in the matrix a variety of likelihood data, including statistical data that may be compiled from other sources or from operation of the problem determination engine 220. This data is used to determine how questions should be sequenced in the flowchart in the most informative order.

Figure 3A:
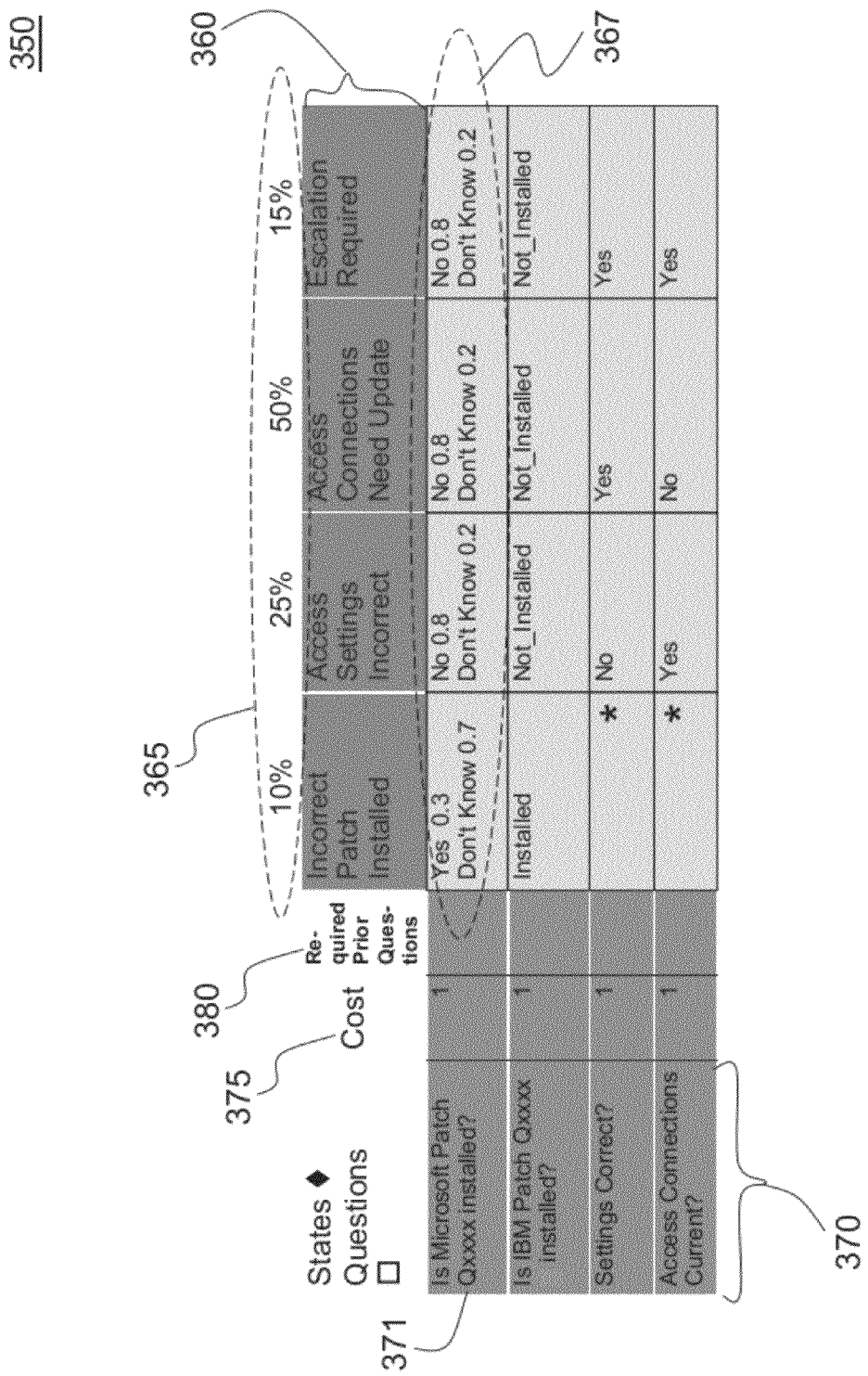

Another example of an abbreviated snippet of a dependency matrix is shown in FIG. 3A. The column headers 360 represent the possible states or underlying problems, the rows headers 370 represent the questions. For each question, the actual question text is given in the first column 370. The cost of asking the question is given in the second column 375, using a suitable metric. In the preferred embodiment, the units are that of the easiest to answer question. More difficult to answer questions are in general given higher costs than simpler to answer questions. Additionally, questions whose answer may complicate the diagnosis, or that are often answered incorrectly, are typically assigned higher cost. The third column 380 in the matrix gives any mandatory predecessors of a given question. In some applications, it may be unnatural to ask a given question without first asking a prior question or set of questions. These questions are listed in this third column. In the example in FIG. 3A no questions have mandatory predecessors.

Following the mandatory predecessor question column are the expected answers to each of the given questions given the state identified at the column header 360. It is conceivable that a given state does not have a deterministic answer to a given question. In the example dependency matrix 3A, the question "Is Microsoft Patch Qxxxx Installed?" 371 is an example of such a question, in that it is possible that the user simply does not know the answer to the question. Another way of thinking about questions is that they are probes to test for the existence of symptoms of an underlying condition (as in the application of the invention in the medical domain). A given condition, or state, may under certain circumstances present itself with a given symptom, but not necessarily in all circumstances. Consider, for example, a medical example where the underlying condition of Lyme Disease may or may not present itself with the symptom of a red ring around the Lyme tick bite. In response to question 371 one sees that the author of the matrix has specified that regardless of the state or underlying condition there is some probability that the answer "Don't know" will be given, as indicated by range of answers 367. Note that the combined probabilities of each answer in the range is the unit value, or 100%. In a preferred embodiment, the system starts with the assumption that the probability of answering the question "Is Microsoft Patch Qxxxx installed?" 371 is as given, but gradually replaces this "prior" probability distribution with that found by experience.

Note that not every answer to a question given a state may be deterministic (as in the case of the answer to the question "Settings correct?" given the state "Incorrect Patch Installed"). In the preferred embodiment an asterisk is used to indicate that a question is not relevant for a given state.

The percentages 365 at the top of each of the state columns are the prior probabilities of occurrence assigned to the states by the author. In the matrix of FIG. 3A, the author has assigned a probability of occurrence of 10% to the state "Incorrect Patch Installed," a probability of 25% to the state "Access Settings Incorrect," and so forth. Note that the total of the probabilities for all the possible states is 100%. And, as in the case of the prior probabilities to the answers to questions, the priors on the probabilities of occurrence of the states assigned by the author are little by little replaced with actual probabilities of occurrence as witnessed by the system.

Figure 4:
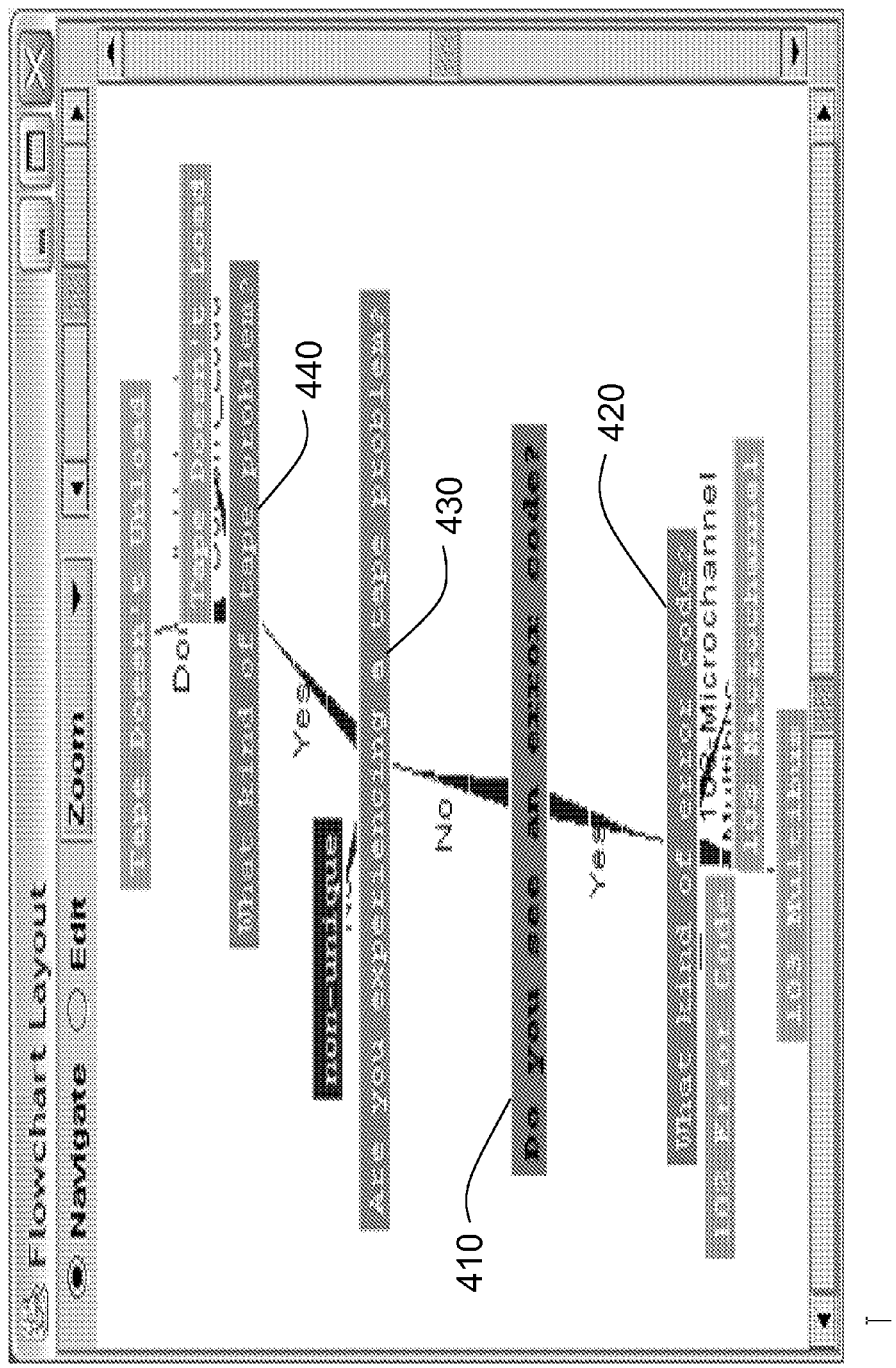
FIG. 4 is an exemplar representation of a portion of a flowchart created from the spreadsheet shown in FIG. 3.

FIG. 4 shows a flowchart constructed from the exemplar dependency matrix 300 shown in FIG. 3. The initial question "Do you see an error code?" 410 is shown with two branches. A "Yes" answer branches to the question "What kind of error code?" 420, and a "No" answer branches to the question "Are you experiencing a tape problem?" 430. A "Yes" answer to this question branches to the question "What kind of a tape problem?" resulting in answers corresponding to the indicated state, that is, the tape "doesn't load" or "doesn't unload". Note that the state probabilities and answer probabilities permit automatic determination of an optimal sequence of questions having an a minimum total cost.

The flowchart can be tested (as shown in block 160 in FIG. 1) in an interactive diagnosis mode using the authoring and evaluation process shown in FIG. 1. That is, the flowchart is used to ask a question, an answer is provided, and then the likely diagnoses are updated (blocks 130 and 140 in FIG. 1), and a revised spreadsheet is generated (as shown in block 150 of FIG. 1). Then the next question is asked and the cycle is repeated interactively. Once the flowchart is deemed satisfactory it is uploaded to the problem determination engine (see blocks 210 and 220 in FIG. 2).

Figure 4A:
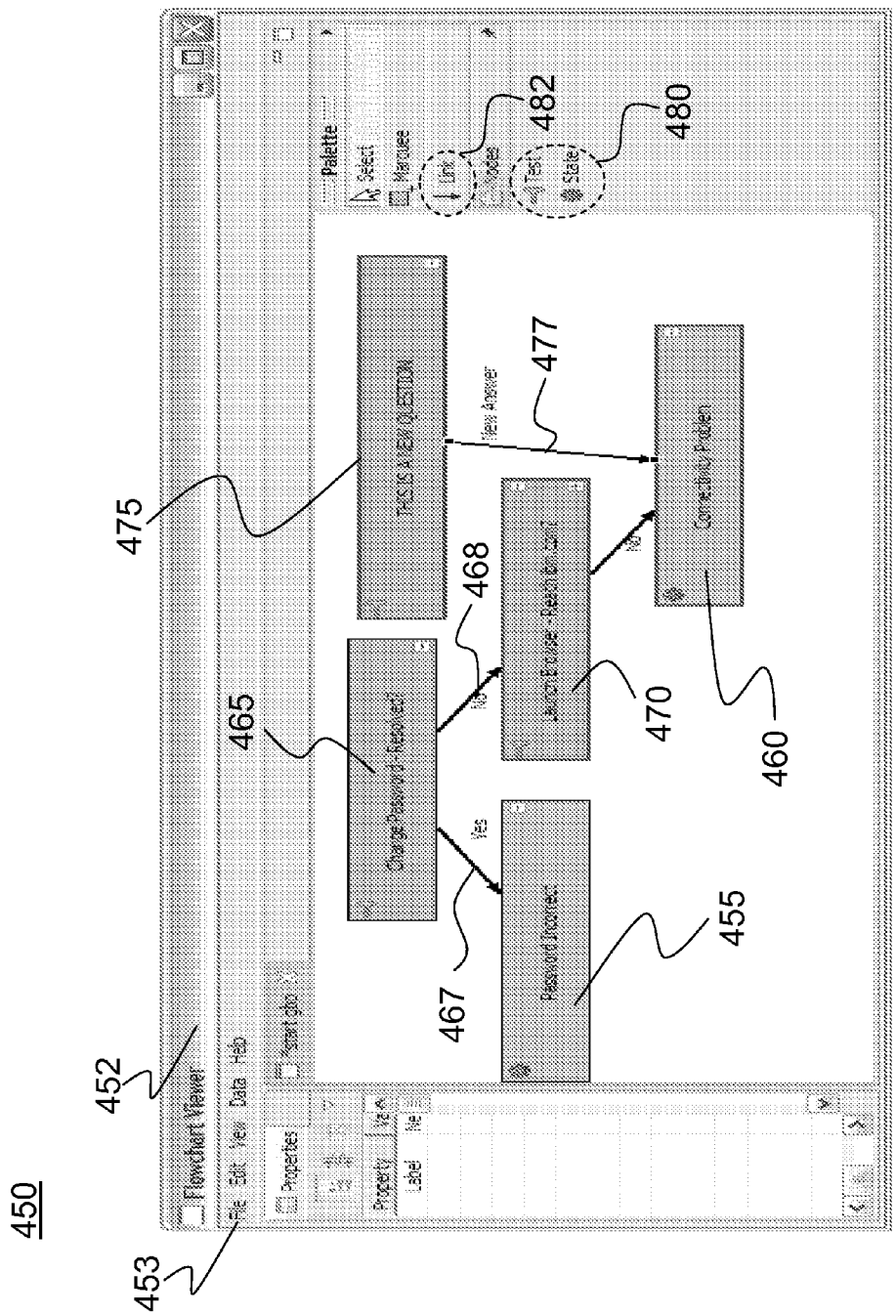
FIG. 4A is another example of flowchart authoring, using a convenient graphical user interface used in the preferred embodiment of the invention.

FIG. 4A shows a screen shot 450 from operation of a preferred embodiment of a flowchart tool used the manual creation of flowcharts (as shown in item 155 of FIG. 1). As is customary, the screen shot shows a title bar 452 and a menu bar 453. The flowchart view presented shows states 455 and 460 and test questions 465, 470 and 475 identified in accordance with legend 480. Answers link 482 questions with a state or a further question. For example, question "Change Password—Resolved?" 465 is linked to the state "Password Incorrect" 455 if the answer is "Yes" 467 and is linked to a further question "Launch browser—reach ibm.com?" if the answer is "No" 468. Note that the implementation provides for construction of new question 475 and new answer 477.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A computer implemented method for developing and maintaining problem resolution flow charts, comprising:
   authoring by a user a dependency matrix of questions and states describing a problem to be resolved, the matrix being formed by crossing said questions with said states, there being a cell in the matrix corresponding to the intersection of each question and each state, each cell containing one or more answers corresponding to the respective state and a respective answer probability for each said answer, each state having a probability of occurrence;
   generating by a computer a problem resolution flowchart from the dependency matrix, said probabilities of occurrence and said answer probabilities being used to optimize the order of said questions in said flowchart; and
   testing the problem resolution flowchart.

2. A method as in claim 1, wherein the authoring step further comprises:
   editing the questions and states; and
   modifying cell values relating each of said questions with each of said states,
   and wherein said probabilities of occurrence and said answer probabilities are updated by said testing.

3. A method as in claim 2, wherein the questions have associated costs expressed in some unit of measure, and wherein the flowchart presents the questions in an optimally informative order.

4. A method as in claim 3, further comprising interactively repeating the authoring, generating and testing steps, wherein answer probabilities are initially estimated by a user and these user estimates are gradually replaced by data from test experience obtained by asking the questions and determining the state of the problem.

5. A method as in claim 4, further comprising using the flowchart in a problem determination engine.

6. A method as in claim 5, further comprising:
   gathering information from operation of the problem determination engine; and
   providing the gathered information for use in interactively repeating the authoring, generating and testing steps.

7. A method as in claim 5, wherein the flowchart generated from the dependency matrix is comprised of branching question and answer sequences, wherein an answer to one question leads to a further question until a problem diagnosis is reached or a terminal node is encountered.

8. A method as in claim 7, wherein the flowchart is generated so as to minimize the expected total cost of the questions required to reach a diagnosis.

9. A method as in claim 3, wherein the associated costs for questions are learned by experience.

10. A method as in claim 3, wherein the optimally informative order of questions is determined automatically from probabilities contained in cell values in the dependency matrix.

11. A system for developing and maintaining problem resolution flow charts, comprising:
    means for authoring a dependency matrix of questions and states describing a problem to be resolved, the matrix being formed by crossing said questions with said states, there being a cell in the matrix corresponding to the intersection of each question and each state, each cell containing one or more answers corresponding to the respective state and a respective answer probability for each said answer, each state having a probability of occurrence;

means for automatically generating a problem resolution flowchart from the dependency matrix, said probabilities of occurrence and said answer probabilities being used to optimize the order of said questions in said flowchart; and means for testing the problem resolution flowchart.

12. A system as in claim 11, wherein the authoring step further comprises:

means for editing the questions and states; and means for modifying cell values relating each of said questions with each of said states, and wherein said probabilities of occurrence and said answer probabilities are updated by said testing.

13. A system as in claim 12, wherein the questions have associated costs expressed in some unit of measure, and wherein the flowchart presents the questions in an optimally informative order.

14. A system as in claim 13, further comprising interactively repeating the authoring, generating and testing steps, wherein answer probabilities are initially estimated by a user and these user estimates are gradually replaced by data from test experience obtained by asking the questions and determining the state of the problem.

15. A system as in claim 14, further comprising using the flowchart in a problem determination engine.

16. A system as in claim 15, further comprising:

gathering information from operation of the problem determination engine; and providing the gathered information for use in interactively repeating the authoring, generating and testing steps.

17. A system as in claim 15, wherein the flowchart generated from the dependency matrix is comprised of branching question and answer sequences, wherein an answer to one question leads to a further question until a problem diagnosis is reached or a terminal node is encountered.

18. A system as in claim 17, wherein the flowchart is generated so as to minimize the expected total cost of the questions required to reach a diagnosis.

19. A computer implemented system for developing and maintaining problem resolution flow charts, the computer having software modules stored thereon and having a processor operable to execute the software modules, comprising:

first computer executable code for authoring a dependency matrix of questions and states describing a problem to be resolved, the matrix being formed by crossing said questions with said states, there being a cell in the matrix corresponding to the intersection of each question and each state, each cell containing one or more answers corresponding to the respective state and a respective answer probability for each said answer, each state having a probability of occurrence;

second computer executable code for automatically generating a problem resolution flowchart from the dependency matrix, said probabilities of occurrence and said answer probabilities being used to optimize the order of said questions in said flowchart; and third computer executable code for testing the problem resolution flowchart.

20. A system as in claim 19, wherein said first computer executable code for authoring a dependency matrix further comprises:

fourth computer executable code for editing the questions and states; and fifth computer executable code for modifying cell values relating each of said questions with each of said states, and wherein said probabilities of occurrence and said answer probabilities are updated by said testing.

* * * * *